United States Patent
Shizuno et al.

(10) Patent No.: US 6,936,333 B2
(45) Date of Patent: Aug. 30, 2005

(54) BULKY SHEET AND PROCESS FOR PRODUCING THE SAME

(75) Inventors: Akihito Shizuno, Tochigi (JP); Kenji Ishikawa, Tochigi (JP); Kouji Machii, Tochigi (JP); Hiromichi Suzuki, Tochigi (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 09/926,099

(22) PCT Filed: Feb. 13, 2001

(86) PCT No.: PCT/JP01/00976

§ 371 (c)(1),
(2), (4) Date: Aug. 31, 2001

(87) PCT Pub. No.: WO01/71081

PCT Pub. Date: Sep. 27, 2001

(65) Prior Publication Data

US 2003/0008108 A1 Jan. 9, 2003

(30) Foreign Application Priority Data

Mar. 24, 2000 (JP) .......................................... 2000-085327
Feb. 13, 2001 (JP) .......................................... 2001-034756

(51) Int. Cl.[7] ............................. B32B 3/10; A47L 13/10
(52) U.S. Cl. ........................ 428/156; 428/170; 428/171; 428/172
(58) Field of Search ................................. 428/156, 170, 428/171, 172, 166, 167, 169; 15/209.1; 442/408

(56) References Cited

U.S. PATENT DOCUMENTS

| | | | |
|---|---|---|---|
| 4,609,518 A | | 9/1986 | Curro et al. |
| 4,704,113 A | * | 11/1987 | Schoots ...................... 604/379 |
| 4,718,152 A | | 1/1988 | Suzuki et al. ................. 28/104 |

(Continued)

FOREIGN PATENT DOCUMENTS

| | | |
|---|---|---|
| EP | 0 872 206 A1 | 10/1998 |
| JP | 62-57975 | 3/1987 |
| JP | 62-69867 | 3/1987 |

(Continued)

OTHER PUBLICATIONS

Horrocks, A.R. and Anand, S.C., Handbook of Tehnical Textiles, 2000, Woodhead Publishing Limited, pp. 150–151.*

Japanese Patent Office Sep. 16, 2003 Notice of Rejection, Application 2001–034756.

*Primary Examiner*—Harold Pvon
*Assistant Examiner*—Alicia Chevalier
(74) *Attorney, Agent, or Firm*—Oblon, Spivak, McClelland, Maier & Neustadt, P.C.

(57) ABSTRACT

A bulky sheet comprising a fiber aggregate formed by water needling of a fiber web is disclosed. The bulky sheet has a number of projections and depressions comprising the fiber aggregate. The projections and the depressions is formed both by rearrangement of the constituting fibers of the fiber aggregate by water needling of the fiber aggregate and by the multiple bending manner of the fiber aggregate along the thickness direction thereof. The projections and the depressions retains the shape thereof by themselves.

12 Claims, 3 Drawing Sheets

U.S. PATENT DOCUMENTS

| | | | |
|---|---|---|---|
| 4,840,829 A | | 6/1989 | Suzuki et al. ............... 428/131 |
| 4,883,709 A | | 11/1989 | Nozaki et al. ............... 428/288 |
| 4,970,104 A | | 11/1990 | Radwanski |
| 5,144,729 A | | 9/1992 | Austin et al. ................. 28/105 |
| 5,158,819 A | | 10/1992 | Goodman, Jr. et al. ..... 428/131 |
| 5,178,932 A | | 1/1993 | Perkins et al. .............. 428/198 |
| 5,223,319 A | * | 6/1993 | Cotton et al. ............... 428/131 |
| 5,334,446 A | | 8/1994 | Quantrille et al. .......... 428/284 |
| 5,414,914 A | | 5/1995 | Suzuki et al. |
| 5,525,397 A | | 6/1996 | Shizuno et al. |
| 5,609,947 A | | 3/1997 | Kamei et al. ............... 428/212 |
| 5,718,972 A | * | 2/1998 | Murase et al. .............. 428/360 |
| 5,789,328 A | | 8/1998 | Kurihara et al. ............ 442/387 |
| 5,958,555 A | * | 9/1999 | Takeuchi et al. ............ 428/152 |
| 5,980,924 A | * | 11/1999 | Yamazaki et al. .......... 424/402 |
| 6,058,583 A | | 5/2000 | Takeuchi et al. .............. 28/104 |
| 6,063,717 A | | 5/2000 | Ishiyama et al. ............ 442/387 |

FOREIGN PATENT DOCUMENTS

| | | |
|---|---|---|
| JP | 2-26970 | 1/1990 |
| JP | 4-327255 | 11/1992 |
| JP | 5-25763 | 2/1993 |
| JP | 5-192285 | 8/1993 |
| JP | 5-222657 | 8/1993 |
| JP | 6-17356 | 1/1994 |
| JP | 6-184909 | 7/1994 |
| JP | 7-184815 | 7/1995 |
| JP | 8-60509 | 3/1996 |
| JP | 8-158226 | 6/1996 |
| JP | 09-135798 | 5/1997 |
| JP | 9-324354 | 12/1997 |
| JP | 11-295 | 1/1999 |
| TW | 097070 | 3/1988 |
| TW | 311087 | 7/1997 |
| WO | WO 98/52458 | 11/1998 |
| WO | WO 98 52458 A | 11/1998 |

\* cited by examiner

Fig.4(a)
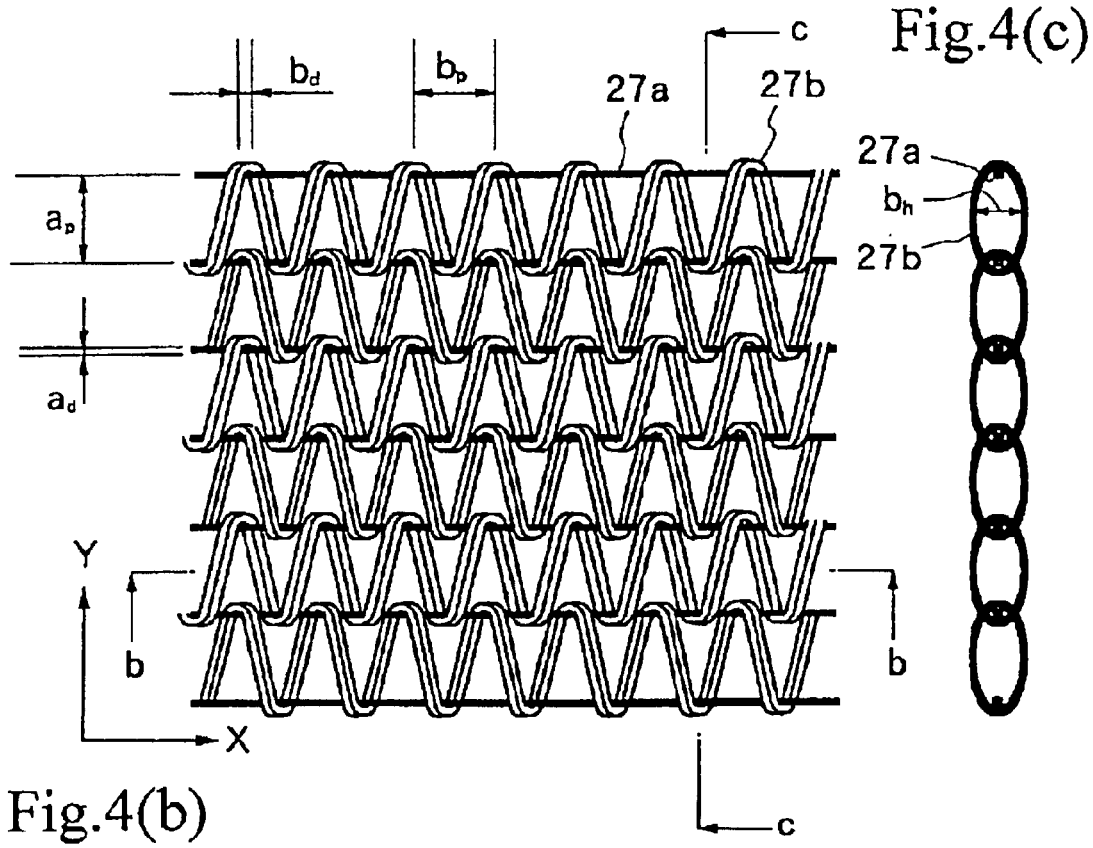
Fig.4(c)
Fig.4(b)
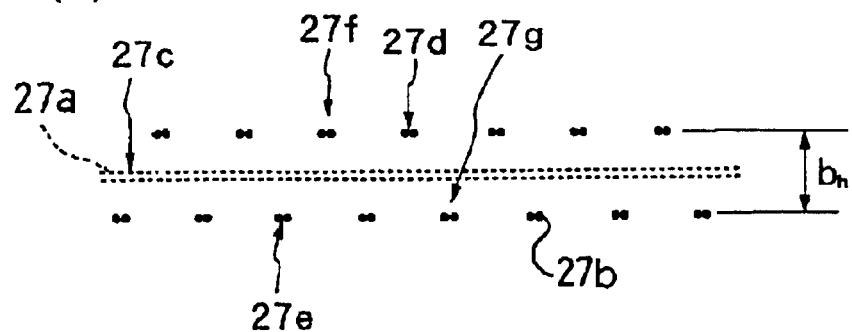

BULKY SHEET AND PROCESS FOR PRODUCING THE SAME

TECHNICAL FIELD

The present invention relates generally to a bulky sheet with a large number of projections and depressions, more particularly, a bulky sheet suited for use as a cleaning sheet or a sanitary article, such as a mask or gauze, and a process for producing the same.

BACKGROUND ART

Japanese Patent Application Laid-Open No. 8-158226 discloses a bulky sheet having unevenness, which is produced by entangling non-heat-shrinkable fibers and highly heat-shrinkable fibers (crimping fibers) into a unitary nonwoven fabric and heating the nonwoven fabric to develop unevenness. However, the degree of unevenness of the bulky sheet is relatively small. Further, the layer made of the crimping fibers gets denser and stiffer on being heated only to provide a sheet with considerably reduced softness. Furthermore, the heat treatment for developing the unevenness raises the cost of production.

Applicant of the present invention previously proposed a method of producing a bulky sheet comprising strengthening nonwoven fabric formed by fiber entanglement with a network sheet and shrinking the network sheet by heat application to form unevenness (see Japanese Patent Applications Laid-Open No. 5-25763 and 5-192285). The sheet obtained may be characterized by its moderate unevenness, a soft feel, and comfortable to the touch, but the method needs a heating unit for shrinking the network sheet. Additionally the pattern of the unevenness (projections and depressions) is ruled by the mesh pattern of the network sheet because the nonwoven fabric follows the shrinkage of the openings of the net to create the unevenness. Therefore, the patterns of projections and depressions that could be given to the sheet are limited.

Japanese Patent Application Laid-Open No. 4-327255 discloses a process of producing nonwoven fabric having an uneven pattern which comprises carrying a fiber aggregate on a carrier belt having patterning projections and applying high-pressure water or hot air downward to the fiber aggregate to press the fiber aggregate onto the belt thereby forming an uneven pattern while entangling the fibers. According to this technique, although nonwoven fabric with arbitrary uneven patterns or designs can be obtained, the nonwoven fabric cannot be thicker than its own thickness and is not bulky.

DISCLOSURE OF THE INVENTION

An object of the present invention is to provide a bulky sheet having a large number of projections and depressions that feels soft and agreeable to the touch and, when used as a cleaning sheet, is capable of picking up dirt or debris from grooves of flooring or uneven surfaces of furniture, appliances, etc. that is difficult to remove with conventional cleaning sheets.

Another object of the present invention is to provide a preferred process of producing the bulky sheet.

The above objects of the present invention are accomplished by a bulky sheet comprising a fiber aggregate formed by water needling of a fiber web, said bulky sheet having a number of projections and depressions comprising said fiber aggregate, said projections and said depressions being formed both by rearrangement of the constituting fibers of said fiber aggregate by water needling of said fiber aggregate and by the multiple bending manner of said fiber aggregate along the thickness direction thereof, and said projections and said depressions retaining the shape thereof by themselves.

The objects are also accomplished by a preferred method for producing the bulky sheet comprising the steps of:

water needling a fiber web to entangle the constituting fibers of said fiber web with each other thereby forming a fiber aggregate;

transferring said fiber aggregate onto a patterning member having a number of depressions and projections or a number of perforations; and projecting part of said fiber aggregate into said depressions or said perforations to form a number of projections corresponding to said depressions or said perforations, said patterning member having a thickness of 5 to 25 mm, or having an air permeability of 800 to 3000 cm$^3$/(cm$^2$sec), the energy Em and the energy Ef are applied to said fiber web and said fiber aggregate, respectively, in such a manner that the energy Em and the energy Ef satisfy at least one of the following formulae:

$$200(kJ/kg) < Em + Ef < 1250(kJ/kg)$$

$$Em/10 < Ef < 2Em/3$$

wherein Em is an energy which is applied to said fiber web to form said fiber aggregate by said water needling, and Ef is an energy which is applied to said fiber aggregate to project part of said fiber aggregate on said patterning member.

The objects are also accomplished by a bulky sheet comprising a fiber aggregate formed by water needling of a fiber web and a network sheet, said bulky sheet having a number of projections and depressions comprising said fiber aggregate, the constituting fibers of said fiber aggregate which are entangled with each other by said water needling are further entangled with and/or thermally bonded to said network sheet thereby forming a unitary body, said projections and said depressions being formed both by rearrangement of the constituting fibers of said fiber aggregate by water needling of said fiber aggregate and by the multiple bending manner of said fiber aggregate along the thickness direction thereof, and said projections and said depressions retaining the shape thereof by themselves.

The objects are also accomplished by a preferred method for producing the bulky sheet comprising the steps of:

water needling a fiber web to entangle the constituting fibers of said fiber web with each other thereby forming a fiber aggregate;

superposing said fiber aggregate on one side or both sides of a network sheet and partially thermally bonding said constituting fibers to said network sheet thereby forming a unitary body, transferring said fiber aggregate onto a patterning member having a number of depressions and projections or a number of perforations; and projecting part of said fiber aggregate into said depressions or said perforations to form a number of projections corresponding to said depressions or said perforations, said patterning member having a thickness of 5 to 25 mm, or having an air permeability of 800 to 3000 cm$^3$/(cm$^2$sec), the energy Em and the energy Ef are applied to said fiber web and said fiber aggregate, respectively, in such a manner that the energy Em and the energy Ef satisfy at least one of the following formulae:

$$200(kJ/kg) < Em+Ef < 1250(kJ/kg)$$

$$Em/10 < Ef < 2Em/3$$

wherein Em is an energy which is applied to said fiber web to form said fiber aggregate by said water needling, and Ef is an energy which is applied to said fiber aggregate to project part of said fiber aggregate on said patterning member.

BRIEF DESCRIPTION OF THE DRAWINGS

FIG. 4(a) is an enlarged plan view of an example of a patterning member 27, FIG. 4(b) is a cross section of FIG. 4(a) taken along line b—b, and FIG. 4(c) is a cross section of FIG. 4(a) taken along line c—c.

BEST MODE FOR CARRYING OUT THE INVENTION

Figure 1:
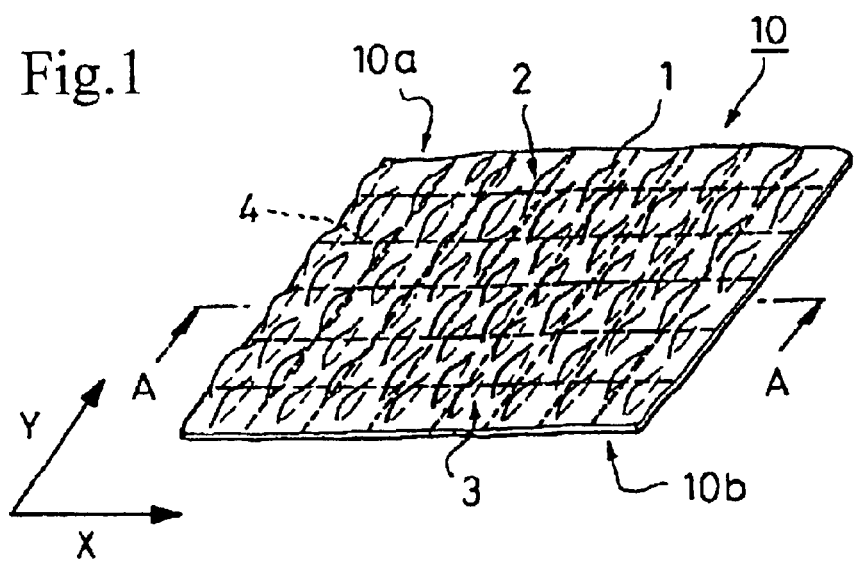
FIG. 1 is an enlarged perspective view of an embodiment of the bulky sheet according to the present invention.
Figure 2:
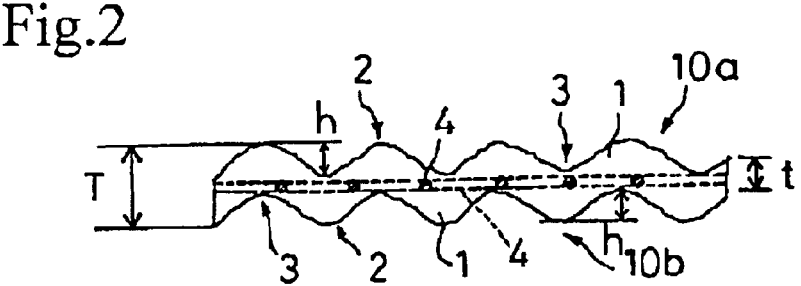
FIG. 2 is an enlarged cross section of FIG. 1, taken along line A—A.

The bulky sheet according to the present invention will be described with particular reference to its preferred embodiment by way of the accompanying drawings. As shown in FIGS. 1 and 2, the bulky sheet 10 of this particular embodiment is composed of a fiber aggregate 1 which is formed by water-needling a fiber web and a network sheet 4 which lies inside the fiber aggregate 1. The fiber aggregate 1 and the network sheet 4 form a unitary body in which the fibers constituting the fiber web 1 (hereinafter "constituent fibers") and the network sheet 4 are entangled with each other by water needling as described later in detail.

As shown in FIGS. 1 and 2, the bulky sheet 10 has a first surface 10a and a second surface 10b and is provided with a great number of projections 2, 2 . . . projecting from one side to the other. Among the projections 2, 2 . . . are formed depressions 3, 3 . . . , making the whole sheet uneven.

As depicted in FIG. 1, the projections 2, 2 . . . are approximately of a size and provided in a regular pattern, each having the shape of a mountain which is long and narrow in its plan view. The distance between the projections 2 and 2 is preferably 1 to 10 mm, still preferably 1 to 7 mm, in the sheet width direction (direction X indicated in FIG. 1 or CD in this embodiment) and 4 to 20 mm, still preferably 4 to 15 mm, in the longitudinal direction (direction Y indicated in FIG. 1 or MD in this embodiment). The projections 2 may be partially continuous in the width and/or lengthwise directions of the sheet. The projections 2 spaced at such intervals not only make the sheet 10 agreeable to the touch but provide a cleaning sheet excellent in removing dust in grooves of flooring or uneven surfaces and catching and holding relatively large foreign matter such as crumbs.

When the bulky sheet 10 is used as a cleaning sheet, it is preferred for both sides thereof to have substantially the same configuration of the projections 2, i.e., the shape, size, and spacing. It is particularly preferred that the total area of the projections 2 on the second surface 10b be 20 to 100%, especially 35 to 100%, of that on the first surface 10a. In a preferred embodiment, a projection 2 on a first surface overlies a depression 3 on a second surface. In another preferred embodiment, shape of the projection 2 is substantially the inverse of the shape the depression.

The projections 2 and the depressions 3 comprise the fiber aggregate 1 and are formed only by the entanglement of the constituent fibers of the fiber aggregate 1. Unlike those projections formed by partially applying heat and pressure to thermoplastic resin fibers by, for example, embossing to cause thermal bonding, the projections 2 and the depressions 3 feel agreeable to the touch. When used as a cleaning sheet, in particular floor use, for example, the bulky sheet 10 exhibits excellent performance in catching and holding dust, hair, lint, etc.

The configuration of the projections 2 can be designed freely as stated above. To the contrary, the configuration of the projections of the bulky sheet described in Japanese Patent Application Laid-Open No. 5-25763 supra, being formed on thermal shrinkage of a network sheet, is governed by the mesh pattern of the network sheet with limited freedom of design.

Since the projections 2 and the depressions 3 of the bulky sheet 10 are formed by rearrangement and re-entanglement of the constituent fibers by the action of water needling, they retain their shape by themselves. Accordingly, the projections 2 and the depressions 3 hardly collapse under load. Because of the presence of the projections 2 and the depressions 3, the bulky sheet 10 has a larger apparent thickness than the thickness of the fiber aggregate 1 before formation of the projections 2 and the depressions 3. On the other hand, the projections formed only by shrinkage of a network sheet as in the 5-25763 and 5-192285 have no shape retention. Assuming that the network sheet is removed from the bulky sheet of the 5-25763 and 5-192285, the projections fail to retain their shape and would readily collapse. When used as a cleaning sheet, the bulky sheet 10 with the projections 2 and the depressions 3 having high shape retention is excellent in cleaning grooves or uneven surfaces and catching and holding bread crumbs, etc. These advantages are particularly pronounced when the bulky sheet 10 is used as attached to a cleaning tool such as a mop. The shape retention is further improved by entangling and/or thermal-bonding the constituent fibers of the fiber aggregate 1 with the network sheet 4.

The shape retention of the projections 2 can be evaluated by the difference between the initial apparent thickness of the sheet under a load of 15 gf/25 cm$^2$ (=59 Pa) and the apparent thickness under a load of 96 gf/25 cm$^2$(=376 Pa), which is a simulated load applied in a cleaning operation (hereinafter "thickness change"). The shape retention is preferably such that the shape of the projections 2 and the depressions 3 is retained even under a load and that the above-identified thickness change is 1 mm or less, particularly 0.8 mm or less.

The language "formed by rearrangement and re-entanglement" as used herein means that a fiber aggregate with its constituent fibers lightly entangled by water needling is again subjected to water needling on a patterning member having a large number of projections and depressions or a large number of perforations to have the fibers rearranged or re-entangled along the projections/depressions or the perforations.

As shown in FIG. 2, the projections 2 and the depressions 3 are formed by multiple bending manner of the fiber aggregate 1 along the thickness direction thereof. A large number of bends formed in the fiber aggregate 1 correspond to the projections 2 and the depressions 3. While the projections 2 and the depressions 3 are formed by rearrangement of the constituent fibers of the fiber aggregate 1, distribution of the constituent fibers caused by migrating the fibers in the projections 2 toward the depressions due to high pressure of water jet is suppressed at a very low level during the formation of projections 2 and the depressions 3. It is noted that progress of the distribution of the constituent fibers results in unfavorable formation of holes in the projections 2. Such a bulky sheet 10 exhibits enhanced bulky structure in spite of its low basis weight. In contrast, the nonwoven fabric disclosed in Japanese Patent Application Laid-Open No. 4-327255 has no bends in the context of the present invention since an uneven pattern is provided in the nonwoven fabric caused by the fiber distribution due to the application of high-pressure water followed by the change in amount of the fibers in the thickness direction thereof. As a result, it is not possible for this nonwoven fabric to achieve high bulkiness. Multiple bending of the fiber aggregate 1 extend over its plane direction including the machine direction (MD) and/or the cross direction (CD). Multiple bending of the fiber aggregate 1 without fiber distribution can be achieved by controlling the energy applied by water needling, as described later.

The degree of bending can be evaluated by the bending ratio, the measurement of which will be described later. The bulky sheet 10 has such a high bending ratio as of 2 to 15%, in particular 3 to 15%.

The density of the projections 2 on one side of the bulky sheet 10 is preferably 50 to 850, in average, in a unit area of 10 cm by 10 cm on any position on that side. With this projection density, the projections 2 and the depressions 3 are disposed in better balance, and the bulky sheet 10 shows more excellent performance as a cleaning sheet in catching and holding both small and relatively large foreign matter such as crumbs.

It is preferred for the bulky sheet 10 to have an apparent specific volume of 23 to 100 cm³/g, particularly 25 to 90 cm³/g, especially 30 to 80 cm³/g. With an apparent specific volume less than 23 cm³/g, the bulky sheet 10, when used as a cleaning sheet, may have difficulty in sufficiently conforming to grooves or uneven surfaces of an object to be cleaned to catch up dirt or foreign matter. If the apparent specific volume exceeds 100 cm³/g, the fiber-to-fiber distance becomes too large, or the thickness of the fiber aggregate becomes too small, which may cause difficulty in holding foreign matter. The apparent specific volume is defined to be a quotient obtained by dividing the apparent thickness (defined below) by the basis weight of the fiber aggregate (the basis weight of the network sheet, if used, is excluded).

The bulky sheet 10 preferably has an apparent specific volume of 18 cm²/g or more, particularly 20 cm²/g or more, under the simulated load in a cleaning operation. The upper limit of the apparent specific volume can be 100 cm²/g.

As shown in FIG. 2, the bulky sheet 10 is extremely bulky, having a larger apparent thickness T (the distance between the highest peak on the first surface 10a and the deepest bottom on the second surface 10b) than the fiber aggregate 1's own thickness t.

The apparent thickness T of the bulky sheet 10 is preferably 1 to 5 mm, still preferably 1.4 to 4 mm, to secure ample space in the sheet to make the sheet bulky and suited for use as a cleaning sheet. The thickness t of the fiber aggregate 1, which is decided by the basis weight of the fiber aggregate 1 and processing conditions, is preferably 0.5 to 4 mm, still preferably 1 to 3 mm. The height h of the projection (see FIG. 2) is preferably 0.2 to 4 mm, still preferably 0.5 to 4 mm. The thickness t of the fiber aggregate 1 is measured by observing a cut area of the bulky sheet under an optical microscope with a load of 15 gf/25 cm² (=59 Pa) applied on the bulky sheet.

The bulky sheet has an elongation of 5% or less, in particular 4% or less in the machine direction (MD) thereof measured under the load of SN at the width of the specimen of 30 mm, in view of the prevention of deformation of the projections 2 and depressions 3 caused by elongating the bulky sheet 10 in the course of production or during the use.

The elongation in the machine direction is measured as follows. A 30 mm wide specimen is cut out of a bulky sheet with the lengthwise direction of the specimen being perpendicular to the machine direction of the sheet. The specimen is clamped in the jaws of a tensile tester to expose a 100 mm gauge length and pulled in the machine direction at a speed of 300 mm/min. The amount of elongation at which the tensile strength shows 5N/30 mm is read. Then, the obtained value is divided by the initial length of the specimen (100 mm) followed by multiplying 100 to obtain the elongation.

Next the fiber aggregate 1 and the network sheet 4 of the bulky sheet 10 will be described. The fiber aggregate 1 which constitutes the bulky sheet 10 is nonwoven fabric formed by water-needling a fiber web to entangle the constituent fibers with each other. Being formed only by the entanglement of the constituent fibers, the fiber aggregate 1 allows the constituent fibers a higher degree of freedom as compared with a web formed by thermal bonding or adhesion of its constituent fibers. As a result, the fiber aggregate 1 has excellent properties of catching and holding foreign matter, such as hair, lint or dust, and feels soft to the touch.

The constituent fiber of the fiber aggregate 1 includes, for example, those described in Applicant's previous application, U.S. Pat. No. 5,525,397, column 4, lines 3–10, the related portions of which are herein incorporated by reference. The fiber aggregate 1 preferably contains fibers having a fineness of 5 dtex or less at an amount of 50% by weight or more, in particular 3.5 dtex or less at an amount of 70% by weight or more, in view of preventing unfavorable formation of holes in the fiber aggregate 1, and enhancing and maintaining the bulky structure of the fiber aggregate 1. In addition, the bulky sheet containing such an mount of such fibers advantageously catch up and hold foreign matters such as hair and dust when it is used as a cleaning sheet. The basis weight of the fiber aggregate 1 and the length of the constituent fibers are selected according to the use of the bulky sheet in relation to the processability, the cost and the like. For example, for cleaning use, the fiber aggregate 1 preferably has a basis weight of 30 to 100 g/m², particularly 40 to 70 g/m², and the constituent fiber preferably has a fiber length of 20 to 100 mm, particularly 30 to 65 mm, in view of the prevention of unfavorable formation of holes in the bulky sheet 10 in the course of production, enhancing the sufficient bulky structure, and maintaining the bulky structure. The fiber aggregate may be combined with a surface active agent or a lubricant which can improve the surface physical properties of the fiber aggregate and can absorb dust, or combined with a lubricant which imparts gloss to the surface to be cleaned.

The bulky sheet 10 according to the present embodiment has a network sheet 4 inside the fiber aggregate 1 as described previously. The network sheet 4 is a resin net of square mesh as shown in FIG. 1. The network sheet 4 preferably has an air permeability of 0.1 to 1000 cm³/(cm²sec). Other kinds of network sheet than the resin net such as nonwoven fabric, paper and film can be used, provided that the air permeability satisfies the above range. The constituent fibers of the fiber aggregate 1 are not only entangled among themselves but entangled with and/or thermally bonded to the network sheet 4 so that the bulky sheet 10 as a whole has improved tensile strength. The network sheet 4 preferably has a thread diameter of 50 to 600 µm, particularly 100 to 400 µm, and a mesh size (distance between adjacent net threads) of 2 to 30 mm, particularly 4 to 20 mm. The network sheet 4 can be made of, for example, the materials described in U.S. Pat. No. 5,525,397, column 3, lines 39–46, the related portions of which are herein incorporated by reference. The material making up the network sheet 4 may be thermally shrinkable provided that the bulky sheet which contains such a network sheet meets the requirement of the present invention. The network sheet 4 made of a thermally shrinkable material could be heat treated in the course of producing a bulky sheet to provide a bulky sheet with an increased apparent thickness T and sharper projections. The bulky sheet 10, however, has not been subjected to a heat shrinking of the network sheet. Alternatively, when the bulky sheet is subjected to heat treatment, the network sheet preferably has a heat shrinkage of 3% or less as measured under 140° C. for 3 minutes.

The bulky sheet 10 preferably has a basis weight of 30 to 110 g/m², particularly 40 to 80 g/m², to secure a feel of moderate thickness and improved processability. From the standpoint of strength enough for practical use, the bulky sheet 10 preferably has a breaking strength of at least 5 N, particularly 7 N or more at the width of the specimen of 30 mm. While it is sufficient for the bulky sheet 10 to have the breaking strength 5 N or more in any direction within the plane direction of the bulky sheet 10, it is preferred that the bulky sheet 10 has the breaking strength 5 N or more in the cross direction (CD) thereof which direction is considered to exhibit the lowest strength within the plane direction of the bulky sheet 10. The upper limit of the breaking strength can be 20 N from the standpoint of practical use.

The breaking strength is measured as follows. A 30 mm wide specimen is cut out of a bulky sheet with the lengthwise direction of the specimen being perpendicular to the fiber orientation direction of the sheet. The specimen is clamped in the jaws of a tensile tester to expose a 100 mm gauge length and pulled in the direction perpendicular to the fiber orientation direction at a speed of 300 mm/min. The load at which the sheet begins to break (the first peak value of a chart in continuous measurement) is read.

A preferred embodiment of the process of producing the bulky sheet according to the present invention is described below with particular reference to the production of the above-described bulky sheet 10. FIG. 3 and FIGS. 4(a) to 4(c) are referred to here. The process according to this embodiment comprises, in the order described, the steps of superposing an upper fiber web 1a and a lower fiber web 1b on the upper and the lower sides of a network sheet 4, respectively, water-needling the fiber webs 1a and 1b to entangle the respective constituent fibers with each other thereby forming a fiber aggregate while further entangling the constituent fibers and the network sheet thereby forming a unitary laminate 6, transferring the laminate 6 onto a patterning member having a large number of depressions and projections, and allowing part of the fiber aggregate to project into the depressions to form a large number of projections corresponding to the depressions.

Figure 3:
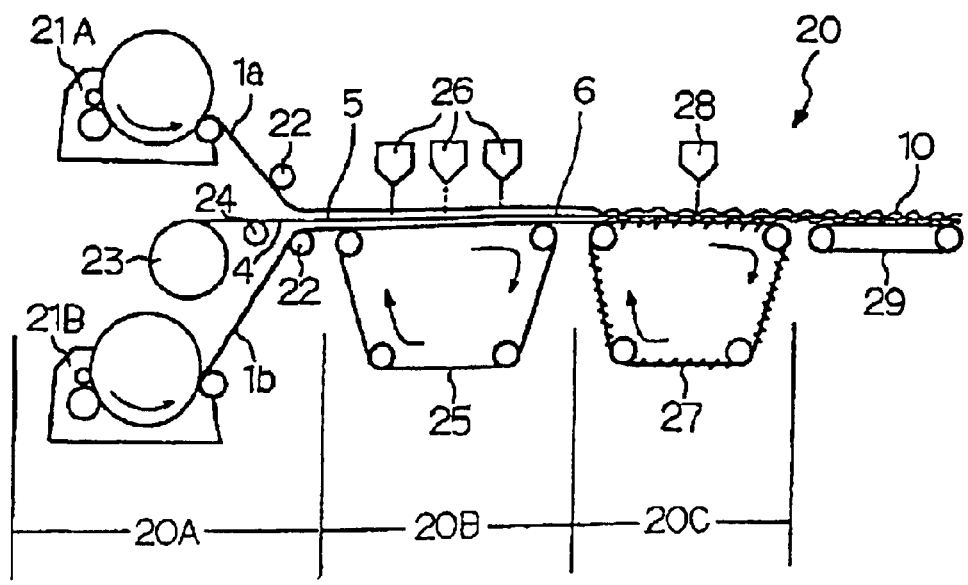
FIG. 3 is a schematic view of an apparatus which can be used to produce the bulky sheet of FIG. 1.

In FIG. 3 is shown an apparatus 20 which is preferably used to carry out the above process to produce the bulky sheet 10. The apparatus 20 is divided into a superposition section 20A, an entanglement section 20B, and a patterning section 20C.

The superposition section 20A comprises carding machine 21A and 21B for making fiber webs 1a and 1b, respectively, a pair of feed rolls 22 and 22 for feeding the fiber webs 1a and 1b, respectively, and a feed roll 24 for feeding a network sheet 4.

The entanglement section 20B has a web supporting belt 25, which is an endless belt, and first water jet nozzles 26.

The patterning section 20C has a patterning member 27, which is an endless belt, and second water jet nozzles 28. The patterning member 27 rotates in the direction indicated by arrows. A transfer belt 29 is provided in the rear of the patterning section 20C. The patterning member 27 preferably has a thickness to some extent, in particular 5 to 25 mm, especially 5 to 15 mm, in view of giving sufficient bulky structure to the sheet 10, and energy efficiency in giving the bulky structure. For the same reasons, The patterning member 27 preferably has an air permeability of 800 to 3000 cm³/(cm²sec), more preferably 800 to 2000 cm³/(cm²sec).

Details of the patterning member 27 are shown in FIGS. 4(a) to 4(c). FIG. 4(a) is an enlarged plan view of the patterning member 27. FIG. 4(b) is a cross section of FIG. 4(a) taken along line b—b, and FIG. 4(c) is a cross section of FIG. 4(a) taken along line c—c.

As shown in FIGS. 4(a) to 4(c), the patterning member 27 is made up of straight wires 27a and helical wires 27b. The straight wires 27a have, for example, a circular or elliptic section and are arranged in parallel to each other at a regular interval. The straight wires 27a are preferably arranged on the same plane. A single helical wire 27b helically curves around every adjacent two straight wires 27a. Every adjacent two helical wires 27b have the same winding direction and winding pitch. A single helical wire 27b is made of two wires whose sections are circular and have the same diameter which are closely bonded side by side to have an ∞-shaped cross section. Of course, a single wire or three or more wires can be employed. The helical wire 27b is curved in such a manner that the line connecting the centers of the two constituent wires is always parallel to the straight wires 27a. Alternatively, the cross section of each wire making a single helical wire 27b may be either circular or elliptic. Both the wires 27a and 27b are made of metal or synthetic resins.

In the embodiment shown in FIG. 4(c), the helical wire 27b, when seen in the helix axial direction, depicts an ellipse whose major axis is parallel with the plane on which the straight wires 27a are arrayed. Alternatively, the helical wire 27b may depict a circle or a triangle when seen in the axial direction.

As shown in FIG. 4(b), the helical wires 27b have a great number of peaks 27d and valleys 27e about a base plane (the plane 27c formed of the straight wires 27a). In short, the patterning member 27 has a large number of projections and depressions. The term "projection" denotes the peak 27d and its vicinity, which are inclusively represented by symbol 27f, while the term "depression" means the portion in the middle of two adjacent peaks 27d which is represented by symbol 27g.

The patterning member runs in direction Y indicated in FIGS. 4(a). The distance $a_p$ between adjacent straight wires 27a determines the length of the projections 2 of the bulky sheet 10. The winding pitch $b_p$, of the helical wire 27b governs the pitch of the projections of the bulky sheet 10

The width $b_d$ of the cross section of the helical wire 27b decides the width of the projections. The minor axis $b_h$ of the ellipse depicted by the helix of the helical wire 27b (the diameter in case where the helix has a circular cross section) regulates the apparent thickness of the resulting bulky sheet. The apparent thickness of the resulting bulky sheet also depends on the energy Em and Ef which will be described later.

The width $a_d$ and the pitch $a_p$ of the straight wires 27a are preferably 1 to 5 mm, still preferably 1 to 3 mm, and 4 to 20 mm, still preferably 4 to 15 mm, respectively. The width $b_d$ and the winding pitch $b_p$ of the helical wire 27b are preferably 1 to 10 mm, still preferably 1 to 6 mm, and 2 to 12 mm, still preferably 2 to 7 mm, respectively. The minor axis $b_h$ of the helix of the helical wire 27b is preferably 3 to 18 mm, still preferably 5 to 15 mm. With the wires 27a and 27b satisfying these conditions, the patterning member 27 is capable of giving a sufficiently uneven surface to the fiber aggregate to provide a bulky sheet.

In the superposition section 20A of the apparatus 20, the fiber webs 1a and 1b are fed from the respective carding machine 21A and 21B via the respective feed rolls 22. The network sheet 4 is unwound from a roll 23 disposed between the cards 21A and 21B, and the fiber webs 1a and 1b are superposed on the respective sides of the network sheet 4 by the feed rolls 22 to form a superposed body 5.

In the entanglement section 20B, the superposed body 5 is transferred onto the web supporting belt 25 and needled with high-pressure water jet streams spouted from the first water jet nozzles 26, whereby the constituent fibers of the fiber webs 1a and 1b are entangled with each other to form a fiber aggregate and, at the same time, these constituent fibers are also entangled with the network sheet 4 to provide an unitary laminate 6. It is preferred for the fibers constituting the fiber aggregate in the laminate 6 to have a low degree of entanglement. The degree of entanglement of the fiber aggregate is preferably such that an entanglement coefficient is in the range of from 0.05 to 2 N·m/g, particularly 0.2 to 1.2 N·m/g. By controlling the degree of entanglement of the fiber aggregate in the laminate so as to have the above-specified range of an entanglement coefficient, the laminate can be given a distinct uneven pattern in the subsequent patterning in the patterning section 20C without making unfavorable holes to provide a bulky sheet which, when used as a cleaning sheet, for example, will catch and hold fibrous foreign matter, such as hair, satisfactorily.

The coefficient of entanglement as referred to above, which is a measure representing the degree of fiber entanglement, is represented by the initial slope of the stress-strain curve measured in the direction perpendicular to the fiber orientation direction. The smaller the coefficient, the weaker the entanglement. The "fiber orientation direction" is a direction in which the maximum load in a tensile test is the highest, the "stress" is the quotient of a tensile load divided by the width of a specimen clamped in the tensile tester and the basis weight of the fiber aggregate 1, and the "strain" means an amount of elongation.

The laminate 6 is then transferred onto the patterning member 27 of the patterning section 20C. While carried on the patterning member 27, the laminate 6 is partially pressed by high-pressure water jet streams spouted from the second water jet nozzles 28, whereby the parts of the laminate 6 which are positioned on the depressions 27g are pressed down and made to project downward into the depressions 27 to form depressions 3 (see FIGS. 1 and 2). On the other hand, those parts of the laminate 6 which are positioned on the projections 27f are not allowed to project downward thereby becoming projections 2. As a result, the laminate 6 is made uneven as a whole, having a large number of projections 2, 2 . . . and a large number of depressions 3, 3 . . . among the projections 2. The configuration of the projections 2 is decided by the configuration of the patterning member 27 and the entangling energy applied to the fiber aggregate by the high-pressure water jet streams in the entanglement section 20B and the patterning section 20C. The entangling energy is controlled by such conditions as the shape of the water jet nozzles, the alignment of the nozzles (the pitch, the number of rows and the number of nozzles), the water pressure, the line speed, and so forth.

The laminate 6 thus patterned is then transferred from the patterning member 27 onto the transfer belt 29, where it is dried to give the bulky sheet 10 shown in FIGS. 1 and 2. The resulting bulky sheet 10 of continuous length can be wound into a roll or cut to lengths. The entangle coefficient of the fiber aggregate 1 after it is preferably substantially same as that of the fiber aggregate 1 before it is patterned, i.e., the fiber aggregate 1 after it is patterned preferably has an entangle coefficient of 0.05 to 2 N·m/g, particularly 0.2 to 1.2 N·m/g.

In the above production process, it is preferred that the energy Em and the energy Ef are applied to the fiber web and the fiber aggregate, respectively, in such a manner that the energy Em and the energy Ef satisfy at least one of the following formulae:

200(kJ/kg)<$Em+Ef$<1250(kJ/kg), in particular 400<$Em+Ef$<1000

$Em/10$<$Ef$<$2Em/3$, in particular $Em/4$<$Ef$<$3Em/5$ wherein Em is an energy which is applied to the fiber web to form the fiber aggregate by water needling, and Ef is an energy which is applied to the fiber aggregate to project part of the fiber aggregate transferred onto the patterning member 27. Within the energy Em and Ef of the above range, the bulky sheet 10, which has sufficient bulky structure and strength, and has no unfavorable holes and fiber falling-off which are likely to occur in the course of production, can be obtained.

The energy Em and Ef are calculated by the following formula, $$\text{Energy}(Em, Ef)(\text{kJ/kg}) = \frac{n\rho v^2 C a}{2VB}\sqrt{\frac{2P}{\rho}}$$

wherein:

n represents number of holes provided in the nozzles per 1 m of the width direction of the nozzles;

$\rho$ represents the density of water (kg/m$^3$);

v represents the flow rate of water at the tip of the nozzle (m/sec);

C represents the flow coefficient due to energy loss (in case of water: 0.592~0.68)

a represents the cross-sectional area of the nozzle at the tip thereof;

V represents the processing speed of the web (m/sec);

B represents the basis weight of the web (g/m$^2$);

P represents the pressure of water (Pa) in the nozzle.

According to the above-described preferred process, a bulky sheet of the present invention can be produced at low cost because a dedicated heating unit is not required unlike the conventional techniques using latent crimping fibers or a thermally shrinkable network sheet. Since formation of projections does not rely on shrink of a shrinkable network sheet, any uneven pattern can be formed as desired irrespective of the mesh pattern of the network sheet simply by exchanging the patterning members 27.

Another process for producing the bulky sheet 10 is then described only as to particulars different from the aforementioned process. Otherwise the description given above applies here. The difference from the aforementioned process resides in that entanglement of the fiber web by water needling to form a fiber aggregate having the above-specified entanglement coefficient precedes superposition on the network sheet and that the laminate of the fiber aggregate and the network sheet is made into a unitary body by partial thermal bonding by a prescribed means, which is then given an uneven pattern. The projections formed by this process also have high shape retention. When, in particular, the partial thermal bonding of the fiber aggregate formed by water-needling the fiber web and the network sheet is carried out by heat and pressure application by, for example, embossing, and the resulting unitary laminate is treated with high-pressure water jet streams on a patterning member having a large number of projections and depressions or a large number of perforations to allow part of the fiber aggregate to project into the depressions or the perforations, a large number of projections corresponding to the depressions or the perforations are formed and, at the same time, the fiber aggregate is entangled with the network sheet to form projections with improved shape retention. It is preferred that the energy Em and Ef applied by water needling is the same range as described above.

The fiber constituting the fiber aggregate used in this method is characterized by comprising a thermally bonding fiber. The thermally bonding fiber preferably includes core-sheath type conjugate fibers having a high-melting polymer as a core and a low-melting polymer whose melting point is lower than that of the high-melting polymer by at least 10° C. as a sheath and side-by-side type conjugate fibers having a high-melting polymer and a low-melting polymer joined together. Fiber made of a single low-melting polymer is also preferred. High-melting polymer/low-melting polymer combinations which constitute the conjugate fibers include polypropylene/polyethylene, polyethylene terephthalate/polyethylene, and high-melting polyester/low-melting polyester. The content of the thermally bonding fiber in the fiber aggregate is preferably 20 to 100% by weight, still preferably 40 to 80% by weight.

Figure 5A:
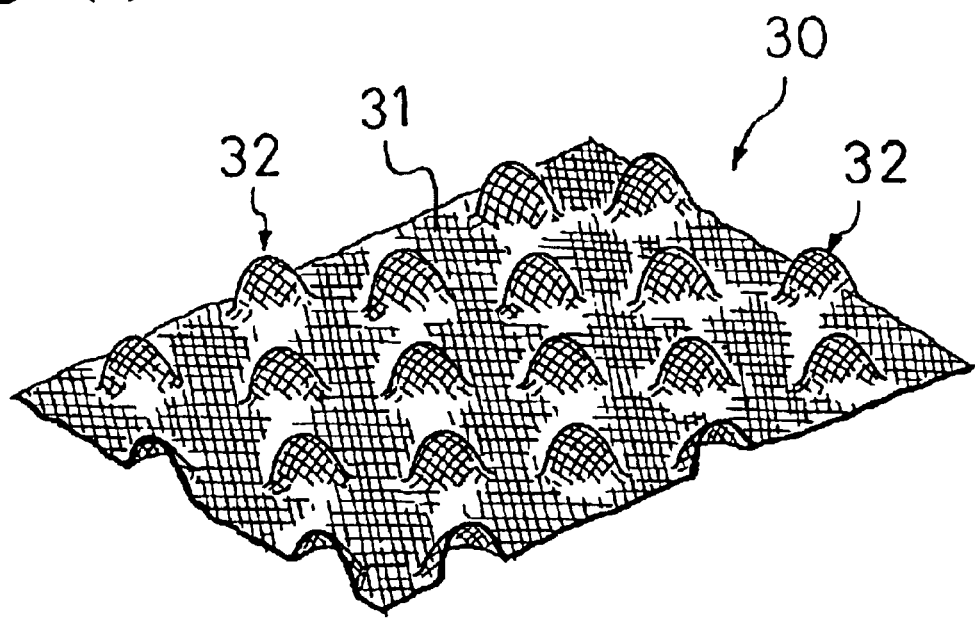
FIG. 5(a) is a perspective view showing another patterning member and FIG. 5(b) is a cross section of the patterning member shown in FIG. 5(a).
Figure 5B:
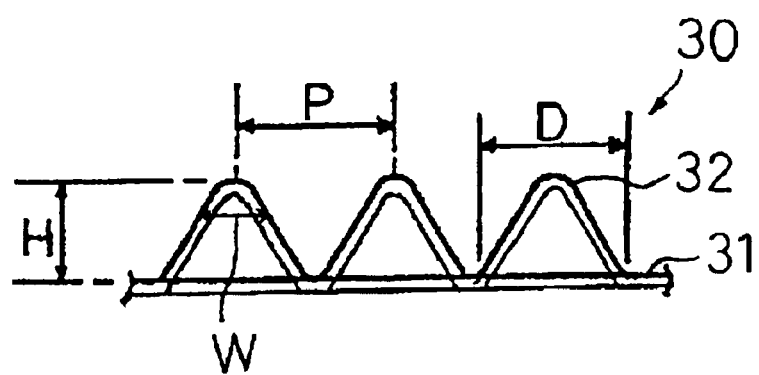

In the above production process, the patterning member shown in FIGS. 5(*a*) and 5(*b*) can be used instead of using the patterning member shown in FIGS. 4(*a*) to 4(*c*). The patterning member 30 shown in FIGS. 5(*a*) and 5(*b*) comprises a wire mesh having liquid permeability. The patterning member 30 comprises a base 31 and a number of projected portions 32 which project from the base 31. The projected portions 32 are formed on one side of the base 31 by allowing part of the base 31 to project. The projected portions 32 are arranged in rows in constant intervals along the longitudinal direction of the patterning member 30. Each rows are arranged in such a manner that the projected portions 32 may not adjoin each other in the width direction of the patterning member 30. The distance between two adjacent projected portions 32 is preferably 3 to 15 mm, more preferably 4 to 10 mm, in view of proper arrangement of the projections 2 and depressions 3 which improves the catching up and holding of both fine dust and relatively large dust such as crumb when the bulky sheet is used as a cleaning sheet.

The projected portions 32 has a round contour in its plan view. Each projected portion 32 is the same size and shape, and has a mountain shape. The projected portions 32 are hollow. The projected portions 32 preferably have a height H (see FIG. 5(*b*)) of 3 to 25 mm, more preferably 5 to 15 mm, in view of proper arrangement of the projections 2 and depressions 3 which enhances and maintains bulkiness of the bulky sheet. The projected portions 32 preferably has a diameter D as measured at the base 31 of 2 to 15 mm, more preferably 3 to 9 mm.

Further, the projected portions 32 preferably satisfy the relationship of $P/9 \leq W \leq P/3$, in view of securing the distance between adjacent two projected portions 32 and enhancing sufficient bulky structure. In the relationship, W represents the two third-height width (see FIG. 5(*b*)) of the projected portions 32 measured from the base 31.

When the fiber aggregate is patterned by use of the patterning member 30, the fiber aggregate is put on the patterning member 30 at the side where the projecting portions 32 are formed.

The present invention will now be illustrated in greater detail with reference to Examples. The basis weight of the resulting bulky sheets was measured. The apparent thickness (the initial thickness T and the thickness under load) and the initial apparent specific volume of the resulting bulky sheets were measured by the method previously described. The entanglement coefficient of the fiber aggregates prepared and the bending ratio of the bulky sheet were determined in accordance with the method described below. Further, the resulting bulky sheets were evaluated in terms of conformability to grooves, and property of catching large items of dust in accordance with the following methods. The results of measurement and evaluation are shown in Table 1.

1) Measurement of Entanglement Coefficient

A 100 mm long and 15 mm wide specimen was cut out of the fiber aggregate along the direction perpendicular to the fiber orientation direction. In case where the specimen contains a network sheet, it is removed to take out only a fiber aggregate. The specimen was clamped in the jaws of a tensile tester at a gauge distance of 50 mm and is pulled in the direction perpendicular to the fiber orientation direction at a speed of 30 mm/min to measure the tensile load for the elongation. The value obtained by dividing the tensile load F (N) by the specimen width (m) and the basis weight W (g/m$^2$) of the fiber aggregate was taken as a stress S (N·m/g) to prepare a stress-strain curve.

$$\text{Stress } S(N \cdot m/g) = (F/0.015)/W$$

The stress-strain curve of a fiber aggregate formed only by entanglement of the constituent fibers depicts a straight line in the initial stage. The slope of the straight line is an entanglement coefficient E (N·m/g).

2) Measurement of the Bending Ratio

A 100 mm long and 15 mm wide specimen was cut out of the bulky sheet along the direction perpendicular to the fiber orientation direction. The length of the specimen La (mm) in the longitudinal direction thereof was measured. Then, a weight weighing 500 g was put on the entire area of the specimen. After 5 minutes later, the weight was removed and the length of the specimen Lb (mm) in the longitudinal direction thereof was again measured. The bending ratio (%) is calculated from (Lb−La)/La×100. In case where the specimen contains a network sheet, in particular a net shown in FIG. 1, La and Lb are desirably measured as follows. A 100 mm long along the direction perpendicular to the fiber orientation and 100 mm wide specimen was cut out of the bulky sheet. The length of the specimen La (mm) in the longitudinal direction thereof was measured. Then the network sheet was cut by a cutter at the points between the intersection of the network sheet along the direction perpendicular to the fiber orientation (attention was paid so as not to cut the fibers). The specimen was then cut into a strip having 15 mm width along the fiber orientation. The weight was put on the strip, and then the measurement of the length Lb was carried out.

3) Conformability to Grooves

A catching ratio of soil present in grooves was measured in accordance with the procedure described below, and the conformability to grooves was evaluated based on the measured ratio. An acrylic resin plate having six grooves at a 3 cm interval was used as an object to be cleaned. Each groove has an inverted triangle-shaped cross section with an opening width of 3.0 mm and a depth of 1.5 mm. A mixture of seven kinds of soil for testing was spread in the grooves over a length of 20 cm each in an amount of 0.01 g per groove (total amount of soil=0.06 g). A sample sheet was attached to a mop-like cleaning tool, Quickie Wiper available from Kao Corp., and the acrylic plate was given two double strokes with the sheet. The weight of the soil caught up in the sheet was measured, and a soil catching ratio was calculated as a percentage of the weight of the caught soil to the weight of the soil spread in the grooves. The conformability of the sheet was rated A (satisfactory), B (not satisfactory) or C (substantial failure to catch up dust) based on the soil catching ratio.

4) Property of Catching Large Foreign Matter

A crumbs catching ratio was measured in accordance with the procedure described below, and the property of catching large foreign matter was evaluated based on the measured ratio. Crumbs having a particle size of 1.0 to 1.4 mm and weighing 0.3 g were scattered on a floor within an area of 1 m by 1 m. That area of the floor was wiped with a sheet attached to Quickie Wiper (Kao Corp.), and the weight of the crumbs caught up in the sheet was measured, from which the crumbs catching ratio was calculated. The property of catching large foreign matter was rated A (satisfactory), B (not satisfactory) or C (substantial failure to catch up) based on the crumbs catching ratio thus obtained.

EXAMPLE 1

Mixed fiber consisting of polyester fiber having a fineness of 0.8 denier (0.9 dtex) and a length of 38 mm and polyester fiber having a fineness of 1.45 denier (1.6 dtex) and a length of 51 mm at a mixing ratio of 70:30 by weight was carded in a usual manner to make a fiber web having a basis weight of 29 g/m$^2$. The resulting fiber web was superposed on each side of a polypropylene net of square mesh (mesh size: 8 mm×8 mm; net thread diameter: 300 μm), and the superposed body was needled with water jet streams having a pressure of 1 to 5 MPa spouted from nozzles to form a unitary laminate having a fiber aggregate having an entanglement coefficient of 0.5 N·m/g. The energy Em applied was 295 kJ/kg. The laminate was transferred onto a patterning member having the structure shown in FIGS. 4(a) to 4(c), and water jet streams spouted from nozzles under a water pressure of 1 to 5 MPa were applied thereon to form an uneven pattern. The patterned laminate was dried in hot air to obtain a bulky sheet having projections and depressions shown in FIGS. 1 and 2. The energy Ef applied was 175 kJ/kg. A lubricant consisting of 90 wt % of liquid paraffin and 10 wt % of a nonionic surface active agent (polyoxyethylene alkyl ether) was applied to the bulky sheet in an amount of 5 wt % based on the sheet.

EXAMPLE 2

A unitary laminate having a fiber aggregate having an entanglement coefficient of 0.79 N·m/g was prepared in the same manner as in Example 1, except for changing the basis weight of the fiber web to 24 g/m$^2$ and changing the energy Em applied to 427 kJ/kg. The resulting laminate was transferred onto a patterning member having the structure shown in FIG. 4 but different in configuration from that of Example 1, and water jet streams spouted from nozzles under a water pressure of 1 to 5 MPa were applied thereon to form an uneven pattern. The patterned laminate was dried in hot air to obtain a bulky sheet having projections and depressions shown in FIGS. 1 and 2, which was applied with a lubricant in the same manner as in Example 1. The energy Ef applied was 252 kJ/kg.

COMPARATIVE EXAMPLE 1

Fiber webs (0.9 dtex×38 mm/1.7 dtex×51 mm=70 wt %/30 wt %, basis weight 24 g/m$^2$) was overlaid on the upper and lower surfaces of a network sheet, respectively, which network sheet was the same as used in Example 1, and then a fiber aggregate was made from the fiber webs by water needling to obtain a laminate. The entanglement coefficient of the fiber aggregate was 0.8 N·m/g. A lubricant was applied to the resulting laminate in the same manner as in Example 1. It is noted that this laminate was not patterned.

COMPARATIVE EXAMPLE 2

A commercially available disposable cleaning sheet with a network pattern, Swiffer supplied by Procter and Gamble (Lot. 9 345 CA12 21 0402 06) was used.

TABLE 1

|  | Example | | Comparative Example | |
|---|---|---|---|---|
|  | 1 | 2 | 1 | 2 |
| Basis Weight of Fiber Aggregate (g/m$^2$) | 58.0 | 48.0 | 48.0 | 52.4 |
| Apparent Thickness T (mm) | 3.2 | 1.5 | 0.9 | 1.1 |
| Apparent Specific Volume (cm$^3$/g) | 55.2 | 31.3 | 18.8 | 21.0 |
| Apparent Thickness under Load (mm) | 2.5 | 1.1 | 0.7 | 0.8 |
| Bending Ratio | 8.5 | 3.7 | 1.2 | 1.0 |
| Conformability to Grooves | A | A | C | C |
| Soil Catching Ratio (%) | 70 | 65 | 10 | 23 |
| Large Foreign Matter Catching Performance | A | A | B | B |
| Crumbs Catching Ratio (%) | 95 | 90 | 70 | 70 |

As is apparent from Table 1, the bulky sheets according to the present invention are highly conformable to grooves and capable of satisfactorily catching up large foreign matter such as crumbs. The bulky sheets of Comparative Examples exhibit poor conformability to grooves, and have poor ability to catch up large foreign matter.

The bulky sheet according to the present invention is not limited in the shape, density and arrangement of the projections. While in the above-described processes, the fiber web is superposed on both sides of the network sheet, it may be superposed on only one side of the network sheet.

For some uses, the bulky sheet of the present invention does not always need the network sheet 4 as used in the aforementioned bulky sheet 10.

The configuration of the network sheet is not particularly limited to that of the network sheet 4 of square mesh used in the embodiments described above, and any network sheet serving as a carrier with which a fiber web can be entangled to form a unitary body can be used.

While the fiber web is subjected to water needling at one side thereof in the above embodiment, both side of the fiber web may be subjected to water needling. In this case, the energy Em is the summation of the energy applied to each side.

The patterning member which can be used in the process of the present invention can have straight wires woven to form square openings instead of the straight wires 27a arranged in parallel. The straight wires 27a arranged in parallel can be displaced with a plate having a large number of square openings, around which the wires 27b are helically wound. Alternatively, perforated plate having a large number of circular openings can be used as the patterning member. The spacing between adjacent openings in the width and lengthwise directions of the plate corresponds to the spacing between adjacent projections of the resulting bulky sheet in the width and the lengthwise directions of the sheet.

INDUSTRIAL APPLICABILITY

The bulky sheet according to the present invention has a large number of projections and feels soft and agreeable to the touch and is therefore suited for use as a cleaning sheet and a sanitary article, such as a mask and gauze. The process according to the present invention provides the bulky sheet of the invention at low cost.

When used as a cleaning sheet, in particular, the bulky sheet of the present invention is extremely superior in dust cleaning performance, being capable of catching and holding dirt such as dust or other small foreign matter on a surface to be cleaned in the interstices among the constituent fibers and also capable of collecting and holding relatively large foreign matter that is difficult to catch among fibers, such as crumbs, in the depressions on its surface. Further, the cleaning sheet conforms to grooves of flooring or uneven surfaces of furniture, appliances, etc. to remove dirt or debris in the uneven surfaces. Having a moderate thickness, the cleaning sheet is convenient to use in wiping operation.

What is claimed is:

1. A bulky sheet comprising:
an entangled fiber aggregate,
said bulky sheet having a number of projections and depressions comprising said entangled fiber aggregate,
wherein said projections have a corresponding depression on an opposite side of said bulky sheet and have a distance between projections in a width direction and a longitudinal direction,
a distribution of said constituting fibers caused by migrating of said fibers in said projections toward said depressions being at a very low level, and
said projections and said depressions retaining the shape thereof by themselves
wherein said entangled fiber aggregate has an entanglement coefficient of 0.05 to 2 N·m/g.

2. A bulky sheet comprising:
an entangled fiber aggregate formed by water needling of a fiber web,
said bulky sheet having a number of projections and depressions comprising said entangled fiber aggregate,
wherein said projections have a corresponding depression on an opposite side of said bulky sheet and have a distance between projections in a width direction and a longitudinal direction,
said projections and said depressions being formed both by rearrangement of the constituting fibers of said entangled fiber aggregate by water needling of said entangled fiber aggregate and by the multiple bending manner of said entangled fiber aggregate along the thickness direction thereof,
a distribution of said constituting fibers caused by migrating of said fibers in said projections toward said depressions being at a very low level, and
said projections and said depressions retaining the shape thereof by themselves
wherein said entangled fiber aggregate has an entanglement coefficient of 0.05 to 2 N·m/g.

3. The bulky sheet according to claim 2, having an apparent thickness of 1 to 5 mm, and an apparent volume of 23 to 100 cm$^3$/g.

4. The bulky sheet according to claim 2, having an elongation of 5% or less in the machine direction thereof measured under the condition of 5 N/30 mm.

5. The bulky sheet according to claim 2, wherein said fiber aggregate contains fibers having a fineness of 5 dtex or less at an amount of 50% by weight or more, and has a basis weight of 30 to 100 g/m$^2$.

6. The bulky sheet according to claim 2, having a breaking strength of at least 5 N at the width of the specimen of 30 mm.

7. The bulky sheet of claim 2, having an entanglement coefficient of 0.2 to 1.2 N·m/g.

8. A process for producing the bulky sheet according to claim 2 comprising the steps of:
water needling a fiber web to entangle the constituting fibers of said fiber web with each other thereby forming a fiber aggregate;
transferring said fiber aggregate onto a patterning member having a number of depressions and projections or a number of perforations; and
projecting part of said fiber aggregate into said depressions or said perforations to form a number of projections corresponding to said depressions or said perforations,
said patterning member having a thickness of 5 to 25 mm, or having an air permeability of 800 to 3000 cm$^3$/(cm$^2$sec),
the energy Em and the energy Ef are applied to said fiber web and said fiber aggregate, respectively, in such a manner that the energy Em and the energy Ef satisfy at least one of the following formulae:

$$200(kJ/kg) < Em + Ef < 1250(kJ/kg)$$

$$Em/10 < Ef < 2Em/3$$

wherein Em is an energy which is applied to said fiber web to form said fiber aggregate by said water needling, and Ef is an energy which is applied to said fiber aggregate to project part of said fiber aggregate on said patterning member.

9. The process according to claim 8, wherein the constituting fibers of said fiber web are entangled with each other by said water needling thereby forming such a fiber aggregate as to have an entanglement coefficient of 0.05 to 2.0 N·m/g.

10. A bulky sheet comprising:
an entangled fiber aggregate formed by water needling of a fiber web and a network sheet,
said bulky sheet having a number of projections and depressions comprising said entangled fiber aggregate,
the constituting fibers of said entangled fiber aggregate which are entangled with each other by said water needling are further entangled with and/or thermally bonded to said network sheet thereby forming a unitary body, said projections having a corresponding depression on an opposite side of said bulky sheet and have a distance between projections in a width direction and a longitudinal direction, and said projections and said depressions being formed both by rearrangement of the constituting fibers of said fiber aggregate by water needling of said fiber aggregate and by the multiple bending manner of said fiber aggregate along the thickness direction thereof, a distribution of said constituting fibers caused by migrating of said fibers in said projections toward said depressions being at a very low level, and said projections and said depressions retaining the shape thereof by themselves wherein said entangled fiber aggregate has an entanglement coefficient of 0.05 to 2 N·m/g.

11. The bulky sheet according to claim 10, wherein said bulky sheet has not been subjected to heat shrinking of said network sheet, or said network sheet has a heat shrinkage of 3% or less as measured under 140° C. for 3 minutes.

12. A process for producing the bulky sheet according to claim 10 comprising the steps of:

water needling a fiber web to entangle the constituting fibers of said fiber web with each other thereby forming a fiber aggregate;

superposing said fiber aggregate on one side or both sides of a network sheet and partially thermally bonding said constituting fibers to said network sheet thereby forming a unitary body;

transferring said fiber aggregate onto a patterning member having a number of depressions and projections or a number of perforations; and projecting part of said fiber aggregate into said depressions or said perforations to form a number of projections corresponding to said depressions or said perforations, said patterning member having a thickness of 5 to 25 mm, or having an air permeability of 800 to 3000 cm$^3$/(cm$^2$sec), the energy Em and the energy Ef are applied to said fiber web and said fiber aggregate, respectively, in such a maimer that the energy Em and the energy Ef satisfy at least one of the following formulae:

$$200(kJ/kg) < Em + Ef < 1250(kJ/kg)$$

$$Em/10 < Ef < 2Em/3$$

wherein Em is an energy which is applied to said fiber web to form said fiber aggregate by said water needling, and Ef is an energy which is applied to said fiber aggregate to project part of said fiber aggregate on said patterning member.

* * * * *